United States Patent [19]

Connors

[11] Patent Number: 5,752,420
[45] Date of Patent: May 19, 1998

[54] APPARATUS AND METHOD FOR CUTTING PIPE

[76] Inventor: David R. Connors, 73 Minerva St., Apt. 3, Derby, Conn. 06418

[21] Appl. No.: 754,226

[22] Filed: Nov. 20, 1996

[51] Int. Cl.$^6$ ..................................................... B26B 27/00
[52] U.S. Cl. .................. 83/54; 83/200.1; 30/92; 30/371
[58] Field of Search .................... 30/92–97, 116, 30/371, 166.3; 83/54, 200.1, 661

[56] References Cited

U.S. PATENT DOCUMENTS

| | | | |
|---|---|---|---|
| 3,495,590 | 2/1970 | Zeiller | 30/166.3 |
| 4,464,836 | 8/1984 | Hissa | 30/166.3 |
| 4,995,153 | 2/1991 | Asbery | 30/166.3 |
| 5,092,047 | 3/1992 | Hinkley | 30/166.3 |

FOREIGN PATENT DOCUMENTS

| | | | |
|---|---|---|---|
| 2423140 | 12/1979 | France | 83/166.3 |

*Primary Examiner*—Maurina T. Rachuba
*Attorney, Agent, or Firm*—Bachman & LaPointe, P.C.

[57] ABSTRACT

A device for cutting pipe includes support structure for contacting a pipe to be cut; an elongate cutting member associated with the support structure defining a loop for enclosing a pipe to be cut; and guide structure for reciprocally guiding the cutting member along a path relative to the support structure, whereby reciprocating the cutting member cuts the pipe.

17 Claims, 7 Drawing Sheets

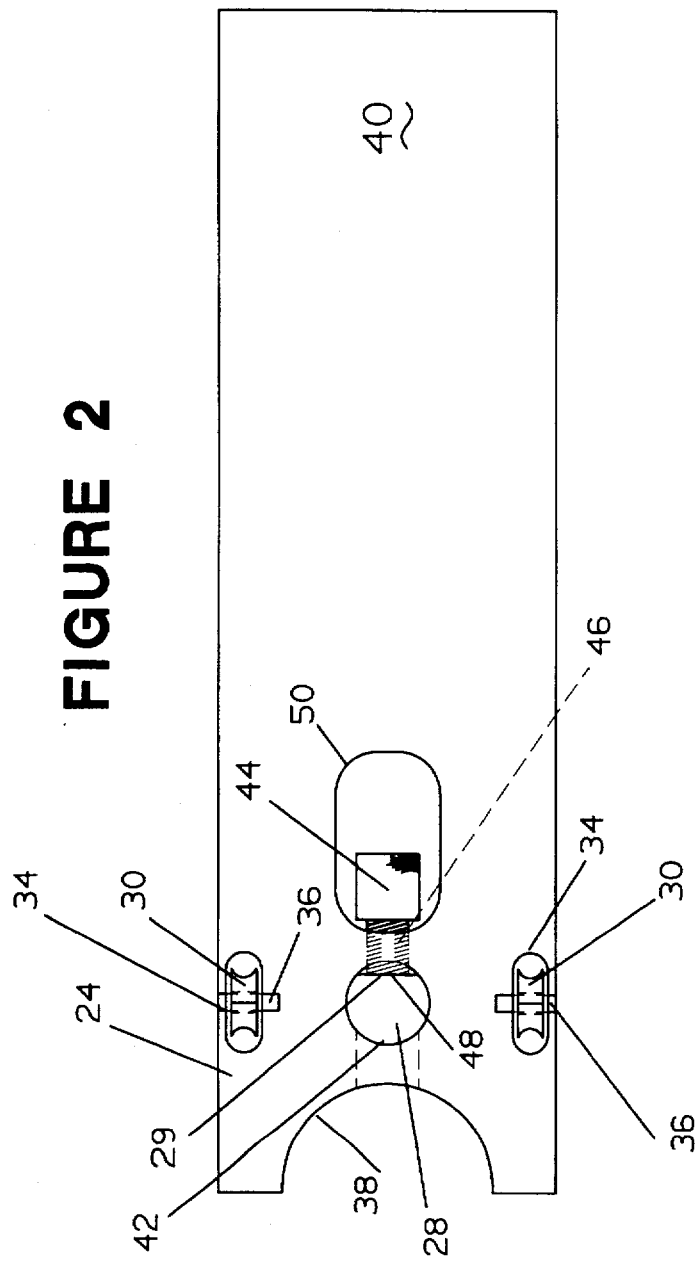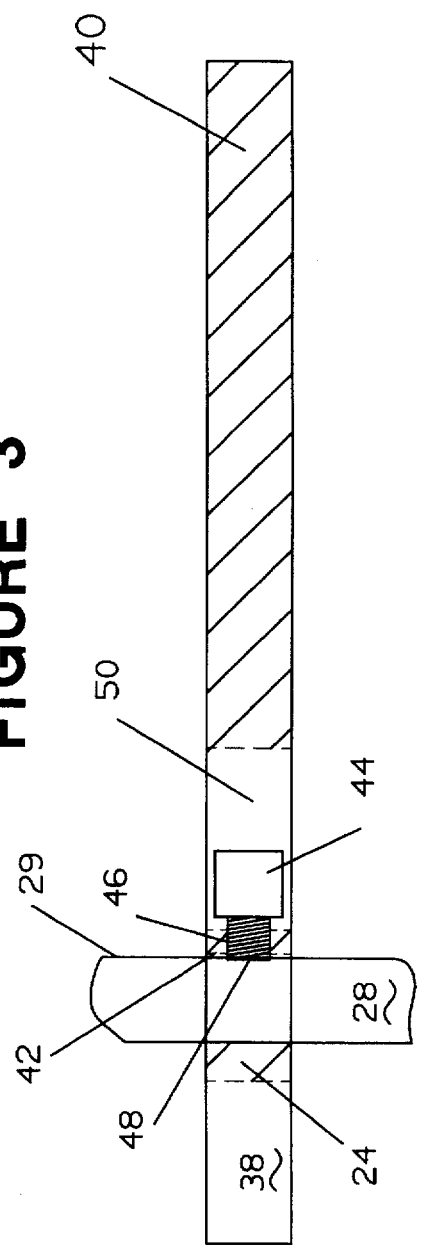

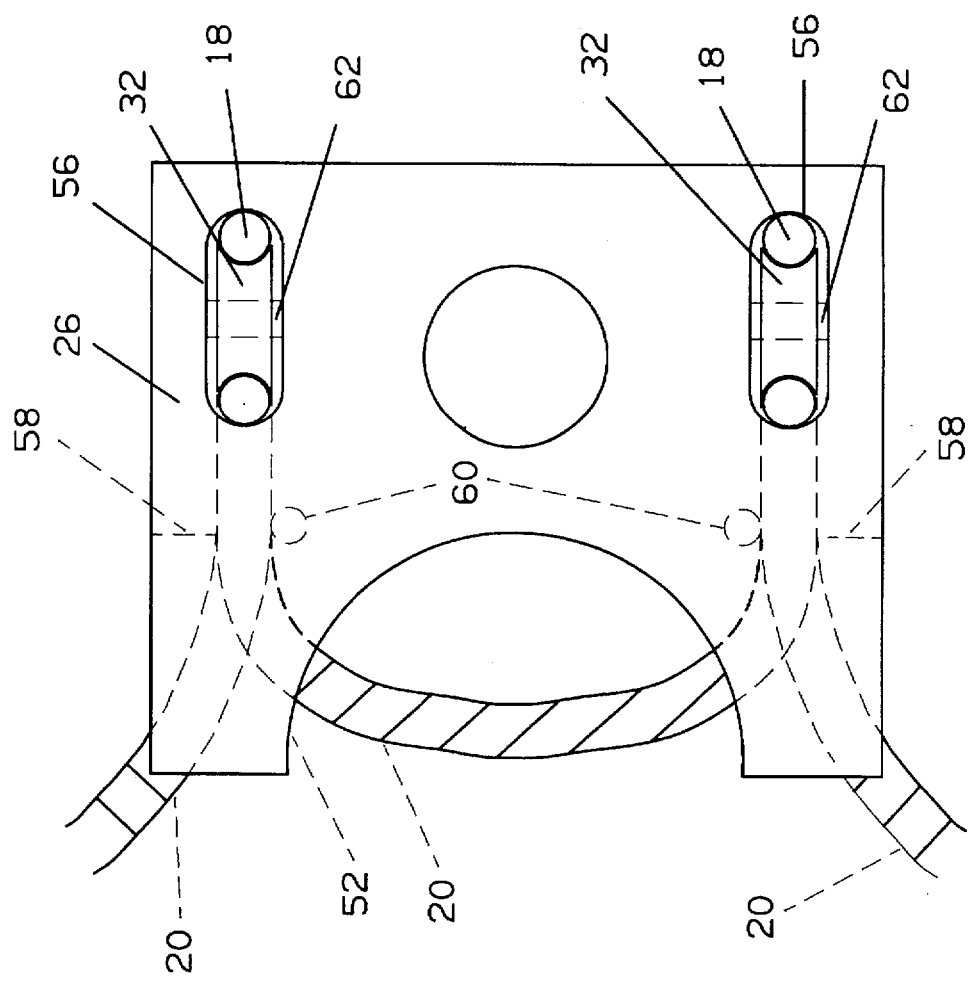

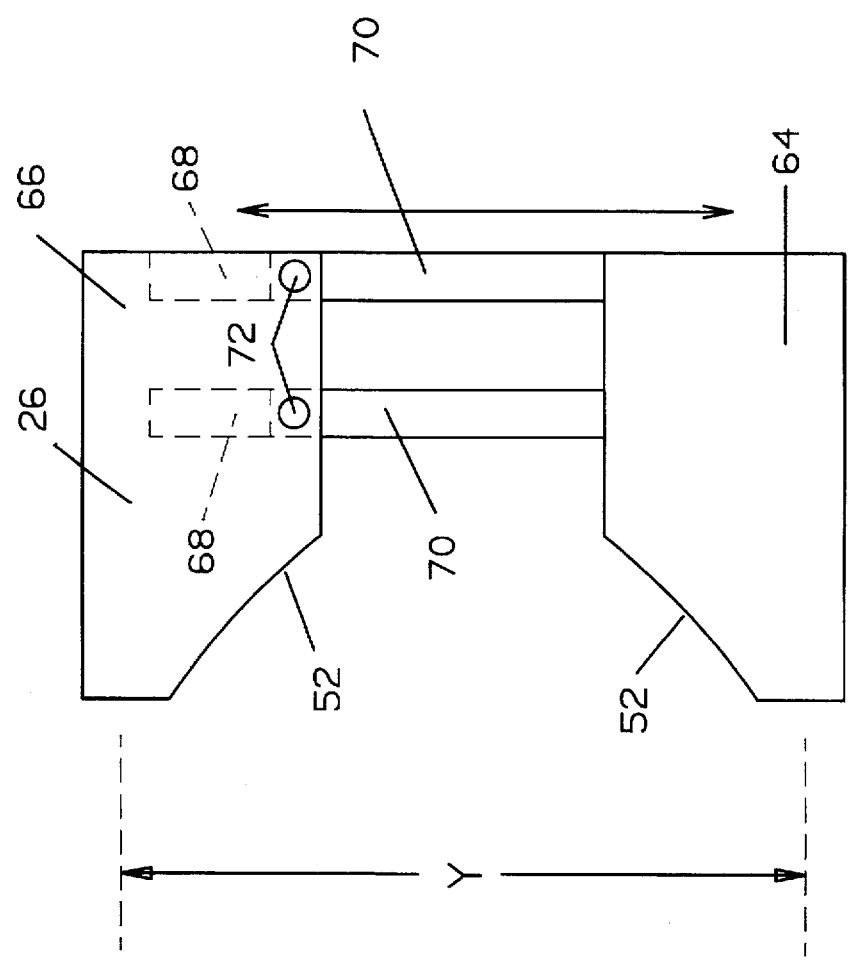

APPARATUS AND METHOD FOR CUTTING PIPE

BACKGROUND OF THE INVENTION

The invention relates to an apparatus and method for cutting pipe, especially for cutting plastic pipe.

In the construction industry, plastic pipe is typically positioned within walls and passing through floor for plumbing and other purposes. Typically, after the floors have been at least partially completed, pipes passing through or to the floor must be cut below the floor level. Cutting pipes in this position is referred to in the industry as cutting the pipe "below grade".

Cutting plastic pipe below grade is a difficult procedure due to the fact that accessing the pipe is difficult. Known methods and apparatuses typically involve cutting the pipe from the inside out in a time consuming and difficult procedure.

It is clear that the need remains for an apparatus and method for cutting pipe, especially below grade pipe, which is simple and effective in use, and which greatly reduces the time required for cutting such pipe in a clean cut during a procedure which is also safe for the operator.

It is therefore the primary object of the present invention to provide a device for cutting pipe which is simple and easy to use.

It is a further object of the present invention to provide a device for cutting pipe which provides easy access to a pipe below a floor or other structure, or "below grade".

It is another object of the present invention to provide a device for cutting pipe which is simple and inexpensive to manufacture, and which is also simple and safe to use.

It is still another object of the present invention to provide a method for cutting pipe, especially for cutting pipe below grade.

Other objects and advantages of the present invention will appear hereinbelow.

SUMMARY OF THE INVENTION

In accordance with the present invention, the foregoing objects and advantages are readily attained.

According to the present invention, an apparatus for cutting pipe is provide, which apparatus comprises: support means for contacting a pipe to be cut; an elongate cutting member associated with the support means defining a loop for enclosing a pipe to be cut; and means for reciprocating the cutting member along a path relative to the support means, whereby reciprocating the cutting member cuts the pipe.

Still further according to the invention, an apparatus for cutting pipe is provided which comprises: support means comprising first and second contact members for contacting a pipe, and means for connecting the first and second contact members in spaced relationship; an elongate cutting member having a central portion extending in a loop from the first contact member for enclosing a pipe to be cut and having two ends extending from the second contact member for translating the cutting member so as to cut a pipe substantially adjacent to the first contact member.

Still further according to the invention, a method for cutting a pipe is provided which comprises the steps of: providing a device comprising support means for contacting a pipe to be cut; an elongate cutting member associated with the support means defining a loop for enclosing a pipe to be cut; and means for reciprocally guiding the cutting member relative to the support means; positioning the support means adjacent to a pipe to be cut with the loop passing around the pipe; and reciprocating the cutting member so that the loop cuts the pipe.

BRIEF DESCRIPTION OF THE DRAWINGS

A detail description of preferred embodiments of the present invention follows, with reference to the attached drawings wherein:

FIG. 2 is a top view of a portion of the apparatus according to the invention;

FIG. 3 is side sectional view of element of FIG. 2;

FIG. 4 is a top view of a lower support member or element of the apparatus according to the invention;

FIG. 5 is a top view of an alternative embodiment of the element of FIG. 4;

DETAILED DESCRIPTION

The invention relates to an apparatus and method for cutting pipe, especially for cutting "below grade" plastic pipe as will be discussed hereinbelow.

Figure 1:
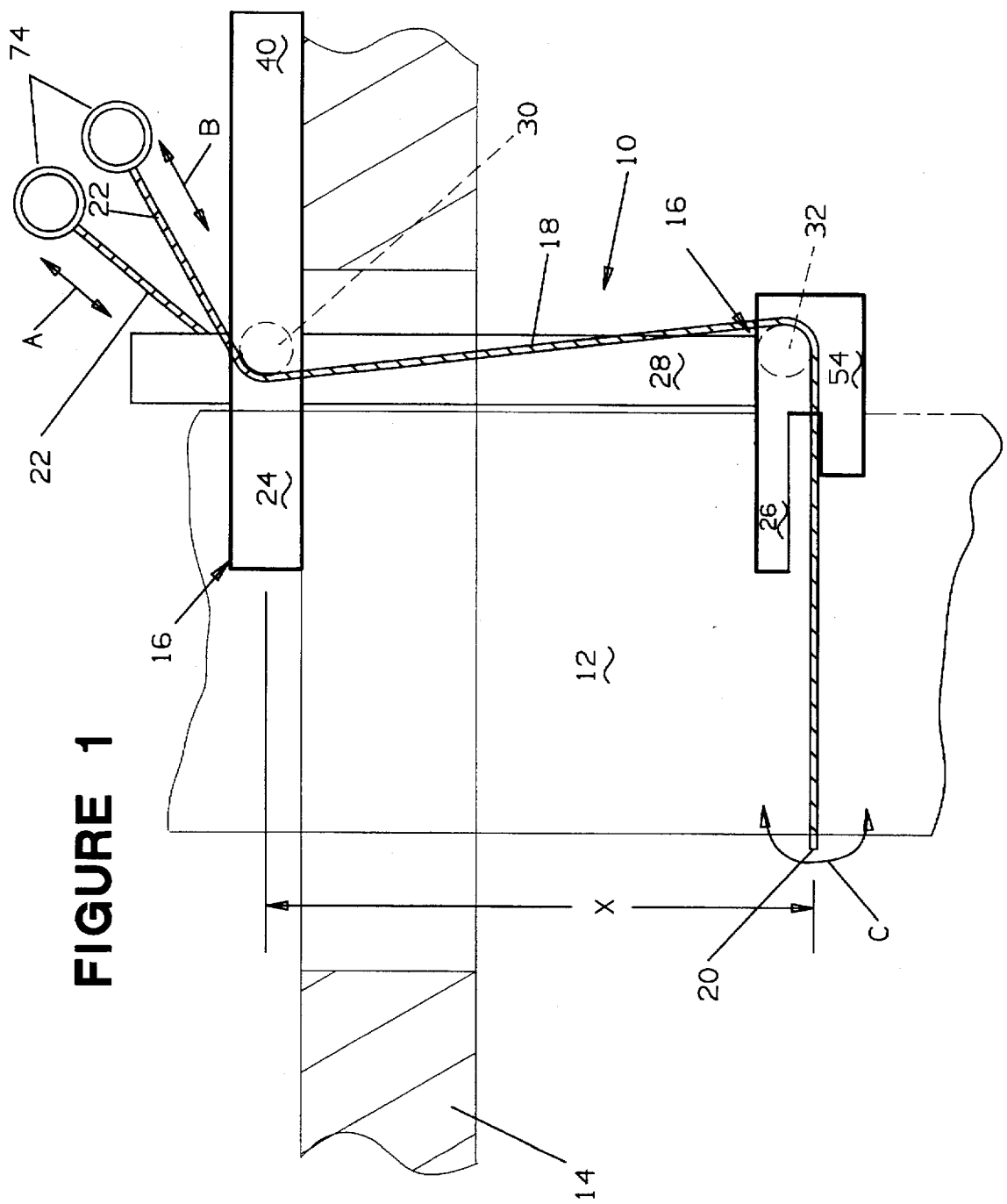
FIG. 1 is a side view of an apparatus according to the invention in position for cutting a below grade pipe.

Referring to FIG. 1, an apparatus 10 in accordance with the invention is shown in position relative to a pipe 12 extending upwardly through a floor 14. According to the invention, and as will be discussed below, apparatus 10 is ideally suited for cutting pipe 12 at a location which is below floor 14, or "below grade".

Apparatus 10 according to the invention preferably includes a support structure 16 for contacting pipe 12, and an elongate friction member or cord 18 slidably positioned within structure 16 for reciprocating relative to support structure 16 so as to frictionally cut pipe 12. Cord 18 is preferably arranged relative to support structure 16 so as to have a central portion 20 arranged in a loop extending from structure 16 for passing around or enclosing a pipe 12 to be cut, and having end portions 22 also extending from support structure 16 for grasping and reciprocating in accordance with the invention so that the loop of central portion 20 frictionally cuts pipe 12.

Structure 16 preferably includes an upper contact member 24 (see also FIGS. 2 and 3), a lower contact member 26 (see also FIG. 4) and a connecting member 28 joining upper member 24 and lower member 26 in spaced relationship as shown in FIG. 1. Upper contact member 24 is preferably provided with a cord guide structure such as pulleys 30, and lower contact member 26 is also preferably provided with a cord guide structure such as pulleys 32, which in combination serve to define a path along which cord 18 is reciprocated during a cutting operation.

Referring to FIG. 2, upper contact member 24 preferably has pulleys 30 positioned within cutouts 34. Cutouts 34 preferably pass through the entire thickness of contact member 24 so that cords 18 can pass through upper contact member 24 as shown in FIG. 1. Pulleys 30 are preferably mounted within cutouts 34 on axles 36 which are preferably adapted for low friction and high endurance. Further, pulleys 30 preferably have an indented surface for receiving cord 18 so as to prevent jamming due to cord 18 slipping off of pulley 30.

Upper contact member 24 preferably has a contact surface 38 for contacting pipe 12 during a cutting operation. Contact surface 38 is preferably substantially arcuate in shape and concave so as to define a nest structure for receiving pipe 12 in a stable position.

Upper contact member 24 preferably also has an extending portion 40 which is shown in the drawings extending away from contact surface 38 so as to provide a foot or knee support which is advantageous in accordance with the invention for use of apparatus 10 in cutting below grade pipe such as is illustrated in FIG. 1. It should be noted that although extending portion 40 is shown in the drawings extending directly back away from contact surface 38, extending portion 40 could alternatively extend in a different direction from contact surface 38, and would still serve to provide a foot or knee support within the scope of the present invention. Accordingly, any substantially flat member substantially rigidly fixed to a portion of apparatus 10 so as to provide structure for stabilizing apparatus 10 during use would be suitable as a foot or knee support in accordance with the present invention.

Connecting member 28 in accordance with the invention is preferably a rod or other suitable structure for connecting or securing upper contact member 24 and lower contact member 26 in spaced relationship. Provision of connecting member 28 in accordance with the invention advantageously serves to allow for positioning of apparatus 10 with lower contact member 26 spaced from upper contact member 24 whereby pipe 12 can be cut at a position spaced from upper contact member 24. This advantageously allows pipe 12 to be cut at a location which would otherwise not be readily accessible. It should of course be noted that apparatus 10 in accordance with the invention can also be used advantageously to cut other pipe in non-"below grade" positions.

According to the invention, upper contact member 24 is preferably slidably positioned with respect to connecting member 28 so that spacing X (see also FIG. 6) between upper contact member 24 and lower contact member 26 can advantageously be adjusted. In accordance with the illustrated embodiment of the invention, connecting member 28 is fixed with respect to lower contact member 26, and slidably positioned in upper contact member 24 within cutout 42. Further, a set screw or other securing member 44 is preferably positioned within upper contact member 24 for securing upper contact member 24 at a desired position relative to connecting member 28 whereby spacing X can be adjusted and secured as desired. As shown, set screw 44 may be a simple threaded member positioned within a threaded bore 46 and having a head 48 for positioning against connecting member 28 within cutout 42. In order to further facilitate use of apparatus 10 in accordance with the invention, threaded bore 46 for set screw 44 may suitably be positioned within a well 50 preferably positioned within the thickness of upper contact member 24 so as provide easy access to set screw 44 when desired, while minimizing the possibility of incidental contact or loosening thereof.

Connecting member 28 may preferably be provided with a flat surface or portion 29 for alignment with set screw 44 as shown so as to enhance resistance to rotation of member 28 relative to screw 44 during use, thereby providing a more stable device.

It should be noted that although this description is provided in terms of upper contact member 24 being slidably positioned on connecting member 28 and securable at various positions thereon, it is of course within the scope of the present invention to provide lower contact member 26 movable with respect to connecting member 28, or to provide connecting member 28 in a telescoping embodiment, or to provide numerous other configurations wherein adjustment of spacing X is provided, all within the scope of the invention. However, the illustrated embodiment is preferred since position of member 28 and lower contact member 26 can be adjusted from upper contact member 24 even with apparatus 10 in position against pipe 12 as shown in FIG. 1.

Figure 6:
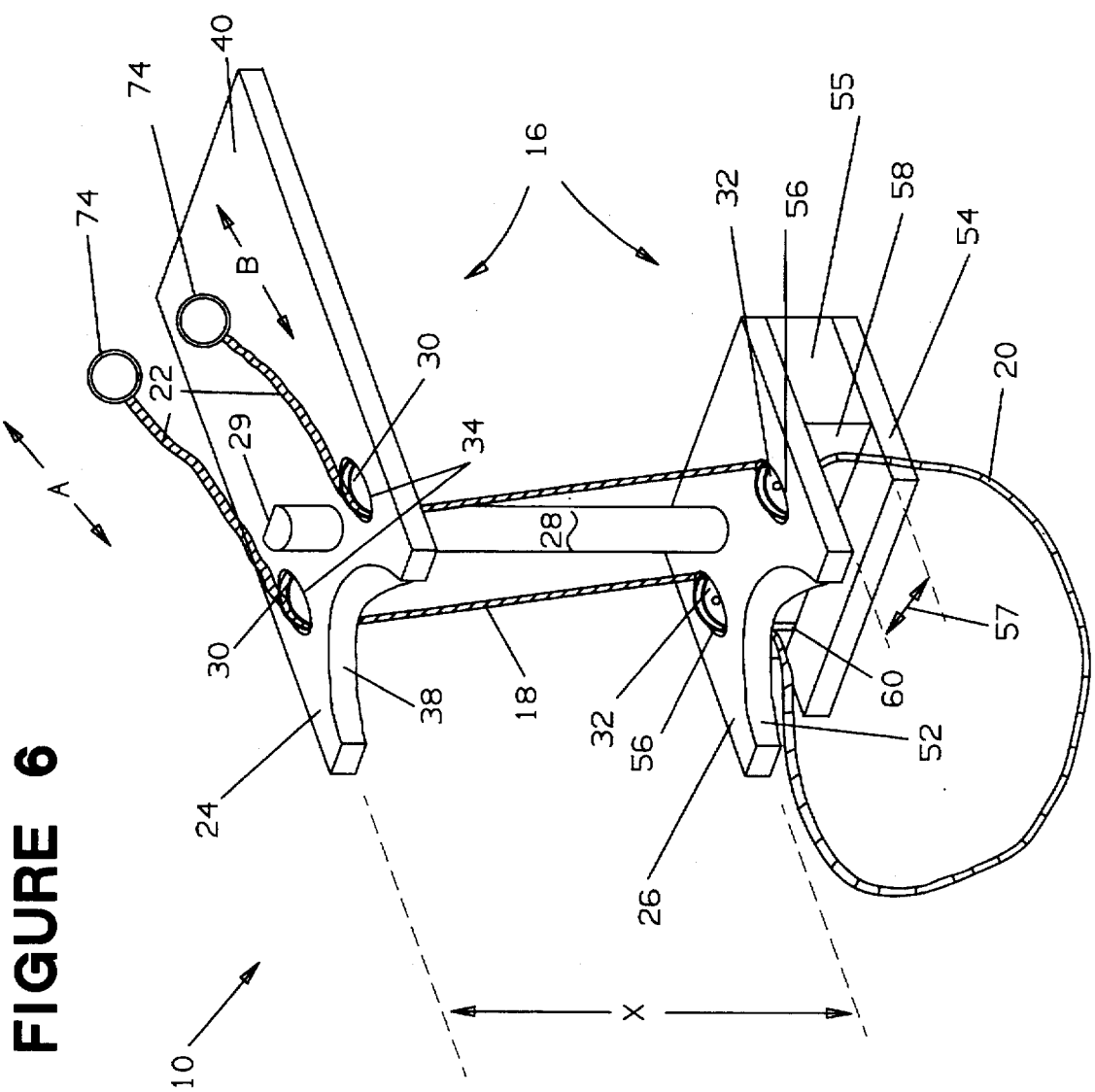
FIG. 6 is perspective view of an apparatus in accordance with the present invention.

FIG. 4 shows a top view of lower contact member 26 in accordance with the invention. As shown, lower contact member 26 preferably also includes a contact surface 52 for contacting pipe 12 during a cutting operation. Contact surface 52 is preferably substantially arcuate in shape and concave so as to define a nest for secure and stable receiving of pipe 12 for cutting in accordance with the present invention. Referring also to FIG. 6, lower contact member 26 preferably has a lower base portion 54 spaced from contact member 26 by intermediate member 55 so that a gap 57 is defined between contact member 26 and lower base portion 54. Central portion 20 of cord 18 preferably extends in a substantial loop configuration from gap 57.

As shown in FIGS. 1, 4 and 6, lower contact member 26 preferably has cutouts 56 for receiving pulleys 32. Cutouts 56 preferably pass through the entire thickness of lower contact member 26 as shown so that cord 18 can pass around pulleys 32 and extend outwardly in the desired loop configuration.

Figure 7:
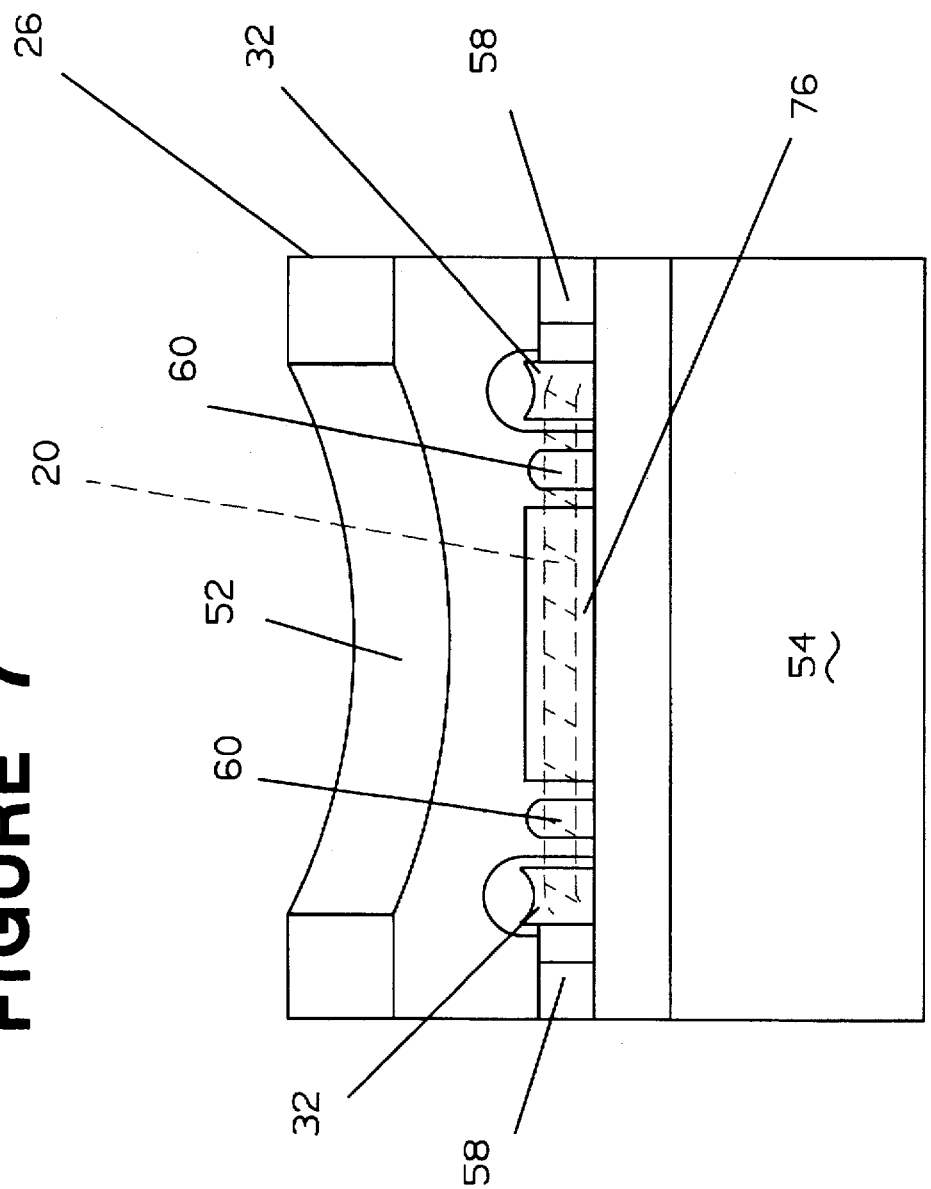
FIG. 7 is a perspective view of a lower support member portion of an apparatus according to the invention.

Referring to FIG. 4, lower contact member 26 is preferably provided with lateral guide structure to keep cord 18 on pulleys 32 regardless of the lateral displacement of cord 18 due to pipes of very large or very small diameter. Referring also to FIG. 7, member 55 may suitably be provided with guide surfaces 58, with pulleys arranged substantially adjacent to surfaces 58 such that cord 18 is guided in a substantially straight orientation onto pulleys 32 during cutting of a large diameter pipe. Further, and also shown in FIG. 4, lower contact member 26 also preferably has inner guide surfaces such as posts 60 positioned laterally inside of pulleys 32 to align substantially tangentially with cord 18 coming off of pulley 32. As shown in FIGS. 4 and 7, pulleys 32 are preferably arranged with outer edges aligned substantially tangentially with surfaces 58, and with inner edges aligned substantially tangentially with posts 60. Guide surfaces 58 and posts 60 in this configuration serve advantageously to guide cord 18 in a substantially straight direction onto and off of pulley 32 regardless of whether cord 18 is angled to loop around a small pipe or portion of pipe 12 as shown in solid lines in FIG. 4, or angled around a large diameter pipe as shown in phantom in FIG. 4.

As shown, pulleys 32 are preferably rotatably held within cutouts 56 by axles 62 which, like axles 36, are preferably of a low friction and high durability type material.

Referring to FIG. 5, in accordance with an alternative embodiment of the invention, upper contact member 24 and lower contact member 26 may be provided so as to have an adjustable width Y so that apparatus 10 can be used with a still larger variety of pipe sizes. Width of contact members 24, 26 may be adjustable through a number of different configurations such as, for example, providing two contact member elements 64, 66 and providing structure laterally slidably and securably holding one contact member element 64 in position relative to the other contact member element 66. FIG. 5 shows element 64 provided with internal tracks 68 and element 66 provided with extensions 70 slidably positioned within internal tracks 68, and further including set screws 72 positioned on contact member element 64 for securably engaging extensions 70 within internal tracks 68 to secure elements 64, 66 at a desired width Y in accordance with the present invention. Of course, it should be readily apparent that a large variety of alternative configurations could be used within the scope of the invention so as to provide width adjustability of contact members 24, 26 in accordance with the present invention.

FIG. 6 shows a perspective view of apparatus 10 in accordance with the invention and shows cord 18 slidably arranged relative to support structure 16. Cord 18 passes through upper contact member 24 at one cutout 42, preferably passing over pulley 30 on a side of pulley 30 facing toward contact surface 38 and pipe 12 to be engaged thereby. Cord 18 passes from pulley 30 downward to one pulley 32 of lower contact member 26, and preferably passes through cutout 56 on a far side of pulley 32 with respect to contact surface 52. Cord 18 then extends outwardly from between gap 57 between lower contact member 26 and lower base portion 54 to define a loop structure which is disposed around or encircling pipe 12 in accordance with the invention so as to cut same. Cord 18 then reenters gap 57 between lower contact member 26 and lower base portion 54 and passes through the other cutout 56 of lower contact member 26, again preferably pas[]sing along the far edge of pulley 32 with respect to contact surface 52. Cord 18 then passes upwardly to the other cutout 34 in upper contact member 24 and passes around pulley 30, preferably on the near side or edge of pulley 30 with respect to contact surface 38.

Each end 22 of cord 18 may preferably be provided with suitable gripping structure such as rings 74 adapted to be grasped by a user of apparatus 10 for back and forth reciprocation of cord 18 as indicated by arrows A, B (see also FIG. 1). Back and forth reciprocation of cord 18 serves to generate friction and/or abrasion between cord 18 and the outside diameter of pipe 12 to be cut, and thereby cuts through pipe 12 providing a clean and rapid cut of same, even in situations where a "below grade" pipe must be cut.

Referring now to FIG. 7, intermediate member 55 is also preferably provided with a cutting surface 76 arranged between pulleys 32 and positioned inwardly from contact surface 52, most preferably substantially aligned with posts 60, so as to serve as a cutting platform for final stages of cutting a pipe. Cutting surface 76 may be provided as a portion of intermediate member 55 or as a separate element positioned between lower contact member 26 and lower base portion 54.

Figure 8:
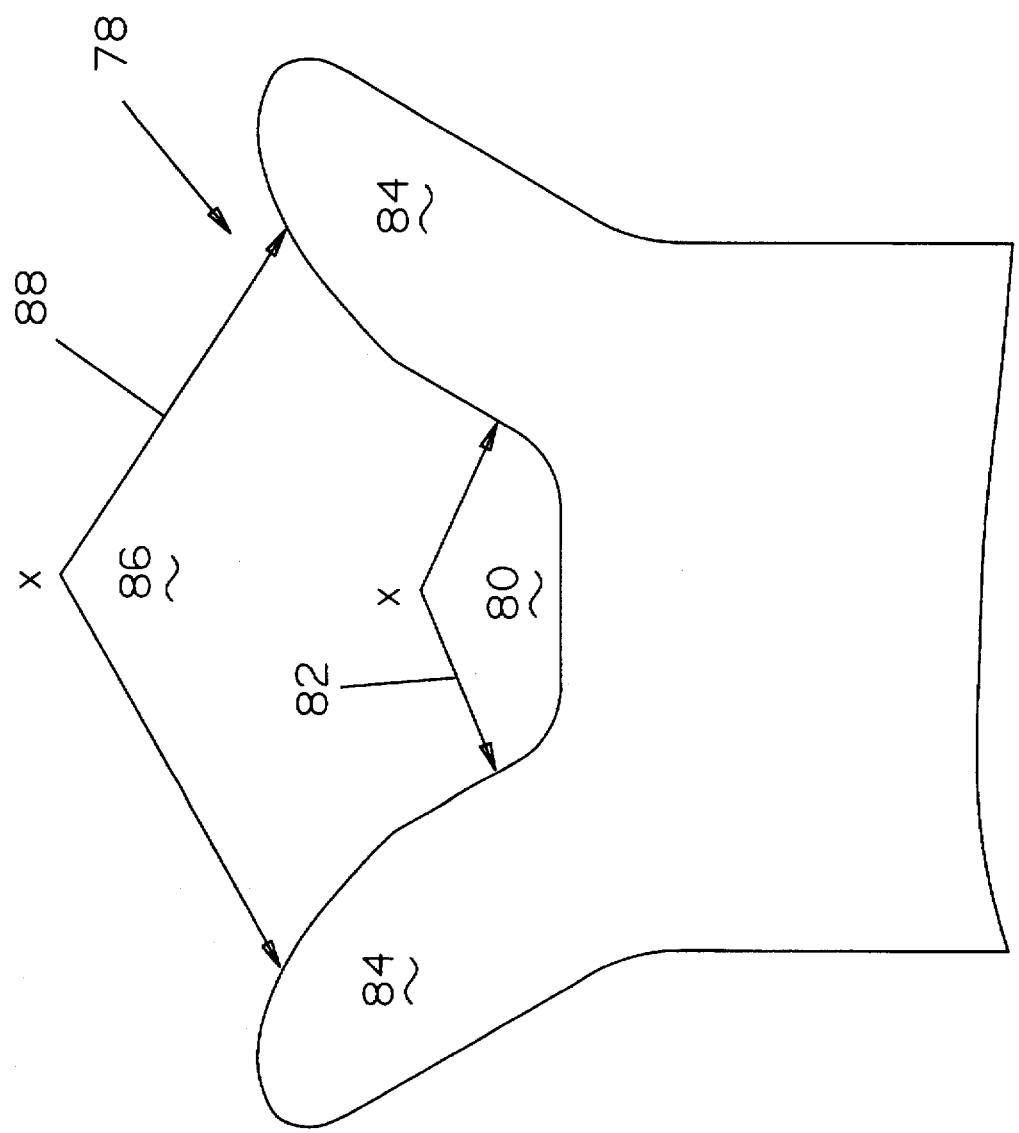
FIG. 8 is a schematic view of an alternative contact surface according to the invention.

FIG. 8 schematically shows another alternative embodiment of a contact surface 78 according to the invention. Contact surface 78 of this embodiment preferably has an inner nest area or portion 80 having a relatively smaller radius 82 and arms 84 defining an outer nest area or portion 86 having a relatively larger radius 88 as shown. Alternative contact surface 78 may suitably be utilized with either or both of upper contact member 24 and lower contact member 26 and advantageously serves to provide nests for receiving pipes of still greater range of diameters.

Referring to the drawings collectively, the operation of apparatus 10 in accordance with the present invention will be described. Initially, apparatus 10 is provided with cord 18 arranged around pulleys 30, 32 so as to define a looped central portion 20 extending from lower contact member 26 and to provide end portions 22 extending from upper contact member 24. For use in cutting a pipe, for example a "below grade" pipe as shown in FIG. 1, the looped central portion 20 of cord 18 is disposed around the pipe, and slid along pipe 12 with apparatus 10 so as to position lower contact member 26 at the desired location for cutting of pipe 12. For use in this cutting environment, extending portion 40 of upper contact member 24 is preferably used as a foot or knee support and placed in substantially flat position on floor 14. Spacing X between upper contact member 24 and lower contact member 26 may then preferably be adjusted, if desired, by loosening set screw 44 and positioning lower contact member 26 along with connecting member 28 as desired, and then again tightening set screw 44 so as to secure upper contact member 24 and lower contact member 26 at the desired spacing X with extending portion 40 of upper contact member 24 resting on floor 14 and with lower contact member arranged to position cord 18 around pipe 12 at the location to be cut.

The user of apparatus 10 may then grasp rings 74 and pull cord 18 back and forth as indicated by arrows A, B so as to cause the looped central portion 20 to pull tight against the outside surface of pipe 12 and reciprocate back and forth against same as indicated by arrow C (see FIG. 1). This reciprocation of cord 18 serves to rapidly and effectively cut into pipe 12 from the outside in, thereby providing a rapid, efficient and clean cut of pipe 12 as desired.

It should be noted that although contact members 24, 26 are referred to in the description as upper and lower respectively, these descriptions would not necessary hold depending upon the use of apparatus 10. For example, apparatus 10 could be utilized to cut a pipe in a ceiling arrangement wherein in use, contact member 26 would be at a higher position than contact member 24.

In accordance with the invention, it has been found that cord 18 may suitably be made of string, nylon, an impregnated fiber or other material impregnated with certain abrasive or other substances so as to provide the desired cutting effect, limber wire and composites thereof. The material of cord 18 is preferably selected depending upon the material of pipe 12 to be cut.

Also, it should be noted that some or all of contact members 24, 26 and connecting member 28 may be made of high strength preferably light weight metals such as aluminum, injection molded plastics, combinations thereof and of any other material having suitable durability to stand use in accordance with the present invention.

In accordance with the above, it should readily apparent that an apparatus and method have been provided for cutting pipes which allow for easy access and cutting of pipes "below grade" situations, and which apparatus is also simple and inexpensive to manufacture, and easy to use.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for cutting pipe, comprising:
   support means for contacting a pipe to be cut, wherein the support means comprises a first contact member and a second contact member and means for connecting the first contact member and second contact member in spaced relationship along the longitudinal axis of the pipe to be cut;

an elongate cutting member associated with the support means defining a loop for enclosing a pipe to be cut; and means for reciprocating the cutting member along a path relative to the support means, whereby reciprocating the cutting member cuts the pipe.

2. A device according to claim 1, wherein the means for connecting further comprises releasable means for securing at least one of the first contact member and the second contact member relative to the other of the first contact member and the second contact member whereby spacing between the first contact member and the second contact member is adjustable.

3. A device according to claim 1, wherein the means for reciprocating further comprises guide means for guiding the cutting member relative to the support means so as to position a central portion of the cutting member defining the loop extending from the first contact member for cutting a pipe, and so as to position ends of the cutting member extending from the second contact member whereby a pipe can be cut adjacent the first contact member by reciprocating the cutting member from the second contact member.

4. A device according to claim 3, further comprising support means extending from the second contact member for supporting the device relative to a pipe to be cut.

5. A device according to claim 4, wherein the support means comprises a substantially flat support member extending from the second contact member.

6. A device according to claim 5, wherein the means for connecting has a longitudinal axis, and wherein the support member extends substantially perpendicular to the longitudinal axis.

7. A device according to claim 3, wherein the guide means comprises at least first and second pulleys mounted to the first contact member and third and fourth pulleys mounted to the second contact member, and wherein the central portion of the cutting member extends from the first and second pulleys and the ends of the cutting member extend from the third and fourth pulleys.

8. A device according to claim 7, further comprising lateral guide means associated with the first contact member for laterally guiding the cutting member over the first and second pulleys whereby the cutting member is guided to the pulleys while cutting pipes of large or small diameter.

9. A device according to claim 8, wherein the lateral guide means comprises at least two outer guide surfaces aligned substantially tangentially with respective outer edges of the first and second pulleys.

10. A device according to claim 9, wherein the lateral guide means further comprises at least two inner guide surfaces aligned substantially tangentially with respective inner edges of the first and second pulleys.

11. A device according to claim 1, wherein the cutting member is a cord selected from the group consisting of string, nylon, impregnated fiber, limber wire and composites thereof.

12. A device according to claim 1, wherein the support means comprises at least one member having a concave arcuate portion defining a nest for contacting a pipe.

13. A device according to claim 12, wherein the arcuate portion comprises at least two segments laterally positionable relative to each other whereby the nest can be adjusted for pipes of different outside diameter.

14. A device according to claim 1, wherein the support means defines an inner nest area having a first radius and an outer nest area having a second radius larger than the first radius whereby the support means is adapted to contact pipes of large and small diameter.

15. A device for cutting pipe, comprising:

support means comprising first and second contact members for contacting a pipe, and means for connecting the first and second contact members in spaced relationship along the longitudinal axis of the pipe to be cut;

an elongate cutting member having a central portion extending in a loop from the first contact member for enclosing a pipe to be cut and having two ends extending from the second contact member for translating the cutting member so as to cut a pipe substantially adjacent to the first contact member.

16. A method for cutting pipe, comprising the steps of:

providing a device comprising support means for contacting a pipe to be cut, wherein the support means comprises a first contact member and a second contact member and means for connecting the first contact member and the second contact member in spaced relationship along the longitudinal axis of the pipe to be cut, an elongate cutting member associated with the support means defining a loop for enclosing a pipe to be cut, and means for reciprocally guiding the cutting member relative to the support means;

positioning the support means adjacent to a pipe to be cut with the loop around the pipe; and reciprocating the cutting member so that the loop cuts the pipe.

17. A device for cutting pipe, comprising:

support means for contacting a pipe to be cut, wherein the support means comprises a first contact member for contacting a pipe to be cut and a second support member for supporting the device relative to the pipe to be cut, said first contact member and second support member being spaced along the longitudinal axis of the pipe to be cut;

an elongate cutting member associated with the support means defining a loop for enclosing the pipe to be cut; and means for reciprocating the cutting member along a path relative to the support means, whereby reciprocating the cutting member cuts the pipe, and wherein the means for reciprocating further comprises guide means for guiding the cutting member relative to the support means so as to position a central portion of the cutting member defining the loop extending from the first contact member, and so as to position ends of the cutting member extending from the second support member whereby a pipe can be cut adjacent the first contact member by reciprocating the cutting member from the second support member.

* * * * *